(No Model.) 2 Sheets—Sheet 1.
U. S. EELLS.
COUPLING FOR BICYCLES.
No. 565,443. Patented Aug. 11, 1896.
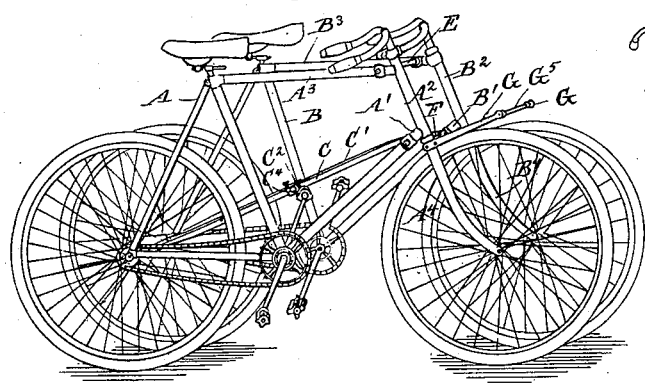
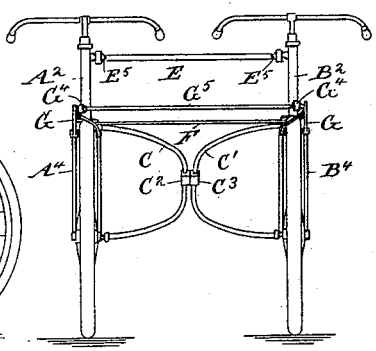
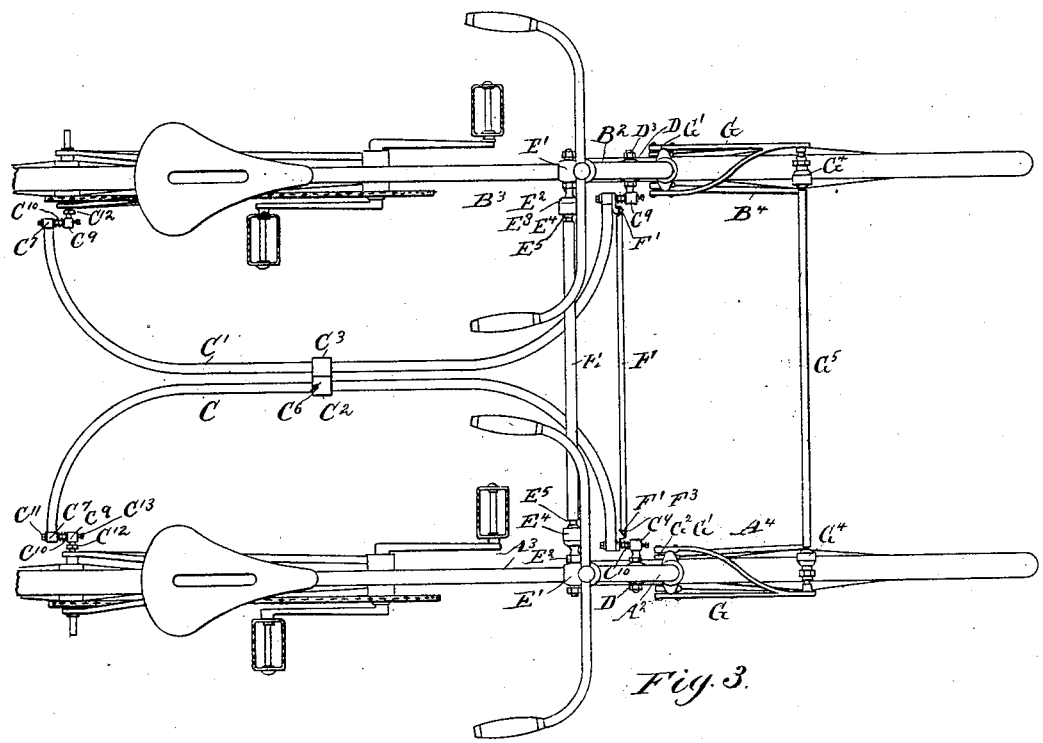
Witnesses:
J. L. Singleton
Chas. E. Searle
Inventor:
Ulysses S. Eells,
by his attorney
Charles R. Searle.

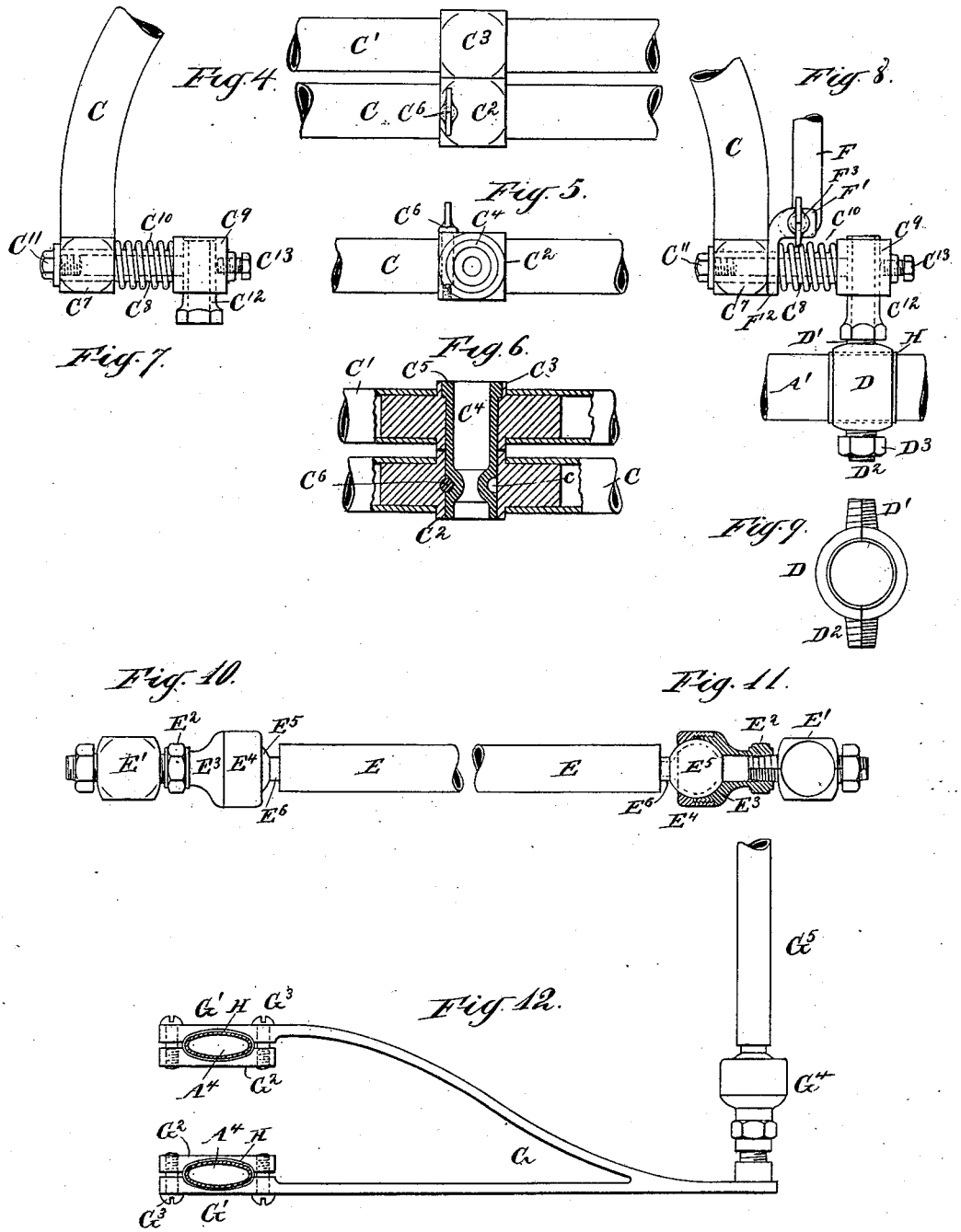

UNITED STATES PATENT OFFICE.

ULYSSES S. EELLS, OF EDGEWATER, NEW JERSEY.

COUPLING FOR BICYCLES.

SPECIFICATION forming part of Letters Patent No. 565,443, dated August 11, 1896.

Application filed July 23, 1895. Serial No. 556,883. (No model.)

*To all whom it may concern:*

Be it known that I, ULYSSES S. EELLS, a citizen of the United States, residing at Edgewater, in the county of Bergen and State of New Jersey, have invented a certain new and useful Improvement in Couplers for Bicycles, of which the following is a specification.

The object of my invention is to provide means for joining two bicycles arranged side by side, which shall be light, easily attached and removed, and of few parts, and shall allow the bicycles a certain freedom of motion relatively to each other not attained in any of the forms of couplers before known to me.

It consists of two parallel bars, arranged longitudinally between the bicycles, pivoted together at a point near the mid-length by a transverse connection and having the ends of each curved outward at right angles and joined by hinges to the bicycle-frames at convenient points at the front and rear. Thus connected, either bicycle may rise relatively to the other by reason of the hinges and also tilt or assume a different vertical angle longitudinally relatively to the other by reason of the pivot connection, while held against relative forward and backward movements, except to the slight degree allowed by buffer-springs arranged in the hinge connections. A cross-brace attached by universal joints to higher points on each frame insures parallelism of the bicycles, so that both assume the same vertical angle laterally when turning curves of short radius. Other cross-rods add to the strength and also connect the steering-gear of each to the other.

The accompanying drawings form a part of this specification and represent what I consider the best means of carrying out the invention.

Figure 1 is a perspective view showing two bicycles joined by my coupler. Fig. 2 is a front view of the same. Fig. 3 is a corresponding plan view on a larger scale. The remaining figures are on a still larger scale and show details of the construction. Fig. 4 is a plan view of the pivot connection. Fig. 5 is a side view of the same, and Fig. 6 is a corresponding horizontal section. Fig. 7 is a plan view of the hinge connection at one end, and Fig. 8 is a similar view at the opposite end. Fig. 9 is an elevation of one of the clamps detached. Fig. 10 is a plan view of the universal joint and connected portion at one end of the cross-brace, and Fig. 11 is a vertical section through the corresponding parts at the opposite end. Fig. 12 is a plan view of one of the brackets attached to the steering-fork.

Similar letters of reference indicate the same parts in all the figures where they occur.

A and B indicate the frames of two bicycles, the several members of each being designated when necessary by supernumerals, as $A'$ $B'$.

$C$ $C'$ are bars, each in effect a counterpart of the other, bent at each end outward on a curve of considerable to a right angle, to sufficiently separate the bicycles. $C^2$ $C^3$ are blocks at about the mid-length of each, bored to receive a hollow pivot $C^4$, extending transversely through and held against withdrawal by an annular head $C^5$, fitting a corresponding counterbore in the block $C^3$, and a thumb-screw $C^6$, extending vertically through the block $C^2$, engaging an annular groove $c$ on the pivot. This construction avoids laterally-projecting parts liable to entangle the clothing of the riders. The adjacent faces of the blocks are finished true and are held in close contact by the pivot, upon which each bar may turn vertically independent of the other.

The curved ends of the bars terminate in sockets $C^7$, bored longitudinally to loosely receive each a pin $C^8$, having a squared head $C^9$, which receives the thrust of a helical spring $C^{10}$, interposed between the head and the block. A flanged stud $C^{11}$, screwed into the end of the pin, bears against the opposite face of the block and holds the pin against withdrawal.

The head $C^9$ is drilled transversely to receive a tubular nut $C^{12}$, held in place by the set-screw $C^{13}$. The bars $C$ $C'$ are connected to the bicycle-frames A B at the rear by screwing the nuts $C^{12}$ upon the rear axles in place of the nut or step, as the case may be, usually there applied. The front connection is secured by screwing the nuts upon peculiarly-formed clamps D, applied to the lower front members $A'$ $B'$ of the bicycle-frames just in rear of the heads $A^2$ $B^2$. The clamps D are each made up of two semicircular halves adapted to embrace the member A' or B' between them, and having two split taper-threaded extensions D' D², one on each end, (see Figs. 8 and 9;) the extension D' matching to the nut C¹² and the other, D², held by a nut D³. The tightening of the nuts on the tapered extensions draws the two halves into close contact with the inclosed member, and insures a reliable hold on the latter, while allowing the clamp to be readily removed and replaced. Thus connected, the two bicycles may incline toward and from each other vertically, the pins C⁸ turning freely in the sockets C⁷ to allow such motion, and they may also and at the same time incline longitudinally relatively to each other by turning on the pivot C⁴.

In order to insure parallelism between the frames A B, a brace E, of the proper length, is applied by means of clamps E', similar to those above described, encircling the upper members A³ B³ of the frames close to the heads A² B², the inwardly-projecting split nipples each engaged by a correspondingly screw-threaded nut E². A socket portion E³ of this nut is of larger diameter, and with a ring E⁴, screwed upon E³, partially incloses a ball E⁵, having a slender neck E⁶, and forms a universal joint, which, while allowing the bicycle-frames to tilt in a vertical plane independently of each other, compels each to incline laterally at the same angle and in the same direction as the other. To reduce the strain thus imposed upon the pivot C⁴, a cross-brace F is introduced at the front, engaged at each end to a lug F' on a collar F², encircling the pin C⁸ behind the spring C¹⁰ and held in place by thumb-screws F³, extending through the brace and lugs. It will be noticed that the use of universal joints on the cross-brace F is unnecessary, because the connection on each side is to the pin C⁸, which is the center of motion at that point. The steering-forks A⁴ B⁴ are also connected so that the coupled bicycles may be controlled by either rider.

G G are forged brackets forked as shown, properly formed at the rear extremities G' to match to the contour of each steering-fork above the front wheel and fastened by correspondingly-formed clamping-pieces G² applied on the inner faces of each member of each steering-fork and secured by screws G³ G³, extending through the portions G' into the pieces G². The other end of each bracket extends forward to a point in line perpendicularly with the center of the front wheel and is joined by means of universal joints G⁴ G⁴ on a straight connecting-rod G⁵ to the other. The joints G⁴ G⁴ are of the same construction as those previously described.

Any looseness in the ball-joints due to wear may be taken up by removing the inclosing ring and reducing its width a little by the application of a fine file or other abrading agent to the screw-threaded end, so that when replaced and screwed home the ball will be drawn into close contact with its socket.

Strips H of chamois leather or other yielding material may be interposed between the several clamps and the bicycle-frame to prevent marring the finely-finished surface of the latter at the points of attachment.

Bicycles intended to be frequently used together may retain the clamps D at the front and the nuts C¹² at the rear in place at all times—the weight of these parts is immaterial—and the wheels may then be coupled by simply applying the remaining parts, which may be carried in a suitable envelop secured to the frame of one of the wheels, or the bars C C' and brackets G may be fastened in place, the bars folded each against its respective frame and tied thereto, the remaining parts being carried upon one or both wheels as above. Thus equipped, when on a long ride the riders may use their wheels independently until it is desired to couple them, the change being made easily and expeditiously.

In addition to the well-known advantages possessed by coupled bicycles, in that each rider may assist in propelling, the stronger exerting a larger proportion of the force, my construction allows the bicycles to assume the usual angular position in turning curves of short radius, and allows one bicycle to rise and surmount an obstruction not in the path of the other without straining any of the parts and without transmitting the shock to the other. Each wheel is so nearly independent of the other that two experienced riders have practically the same freedom of motion and necessity of keeping in balance that they would have on separate wheels, a fact of great importance in teaching. An experienced rider mounted on one of the coupled wheels can control both and avoid accidents, while an inexperienced rider on the other wheel becomes gradually accustomed to the motions and required balancing, and learns to ride much quicker than in the usual way, because the nervous fear of falling is eliminated. Any false move of the inexperienced rider tending to destroy the balance may be resisted and counteracted by the experienced rider.

In mounting the coupled machines they are held upright by one rider on the ground grasping the handle-bar of each while the other mounts. The mounted rider then also grasps each bar and assists in holding the machines until the other is seated, or, after the inexperienced rider is seated as above, the experienced rider may start the wheels and mount in the usual way while in motion Modifications may be made in the forms and proportions within wide limits.

The pivot connection may be farther to the front or rear than here shown, as experiment may determine to be best.

All the parts should be as light as practicable. The rods, brackets, and braces are preferably of steel bicycle-tubing, having the junctions brazed in the usual manner, and the balls and other heavier parts should be bored out and lightened as far as is consistent with the strength.

I claim as my invention—

1. In a coupler for bicycles, arranged side by side, longitudinally-extending bars each adapted to be attached at the ends to one of the frames at points at the front and rear, and joined by a transverse pivot adapted to allow the said bars to tilt vertically relatively to each other, substantially as herein specified.

2. In a coupler for bicycles, the bicycle-frames in combination with longitudinally-extending bars joined at the mid-length by a transverse pivot, each attached at the ends to one of the frames at points at the front and rear by longitudinal hinge connections, adapted to allow the frames to rise vertically relatively to each other, substantially as herein specified.

3. In a coupler for bicycles, the frames A, B, in combination with longitudinally-extending bars joined at the mid-length by a transverse pivot each attached at the ends to the frames at points at the front and rear by hinge connections adapted to allow the said frames to rise vertically relatively to each other, and the buffer-springs located in the said hinge connections to soften the effect of endwise shocks, all substantially as herein specified.

4. In a coupler for bicycles, the frames A, B, in combination with longitudinally-extending bars joined at the mid-length by a transverse pivot, each attached at the ends to the frames at points at the front and rear by hinge connections adapted to allow the said frames to rise vertically relatively to each other, and with a transverse brace connected to each of the frames at a point above said hinge connection, by a universal joint, all substantially as herein specified.

5. In a coupler for bicycles, the frames A, B, in combination with longitudinally-extending bars joined at the mid-length by a transverse pivot, each attached at the ends to the frames at points at the front and rear by hinge connections adapted to allow the said frames to rise vertically relatively to each other, a transverse brace connected to each of the frames at a point above the hinge by a universal joint, and an additional cross-brace joined to the said hinges, all substantially as herein specified.

6. In a coupler for bicycles, the frames A, B, and longitudinally-extending bars C, C' joined to the frames and having blocks $C^2, C^3$ at the mid-length, in combination with the transverse pivot $C^4$ having the head $C^5$ and groove $c$, and the thumb-screw $C^6$ extending through one of the blocks and engaging the groove, all substantially as herein specified.

7. In a coupler for bicycles, the frames A, B, and longitudinally-extending bars C, C' pivoted together at the mid-length and hinged to the frames at the front and rear, in combination with the brackets G joined one to each steering-fork and connected together by the transverse rod $G^5$ and universal joints $G^4$, all substantially as herein specified.

8. In a coupler for bicycles, the frames A, B, and longitudinally-extending bars joined to the frames by hinges each consisting of a tubular nut $C^{12}$ extending from the said frame, the pin $C^8$ having the head $C^9$ bored to receive the said nut, the set-screw $C^{13}$, the socket $C^7$ carried on the bar and receiving the said pin, the helical spring $C^{10}$ inclosing the pin and lying between the head and socket, and the flanged stud $C^{11}$, all combined and arranged to serve substantially as herein specified.

9. The bicycle-frames A, B, longitudinally-extending bars C, C' bent as shown and joined together by the transverse pivot $C^4$ and to the said frames at points at the front and rear, in combination with the brace E and cross-brace F, and the brackets G attached to the steering-forks and the connecting-rod $G^5$ and universal joints $G^4$, all substantially as herein specified.

In testimony that I claim the invention above set forth I affix my signature in presence of two witnesses.

ULYSSES S. EELLS.

Witnesses:
 FRED. HINNERS,
 JOHN H. HINNERS.